(12) United States Patent
Pichon et al.

(10) Patent No.: US 10,148,990 B2
(45) Date of Patent: Dec. 4, 2018

(54) VIDEO STREAMING RESOURCE OPTIMIZATION

(71) Applicant: Cisco Technology, Inc., San Jose, CA (US)

(72) Inventors: Mathieu Pichon, Paris (FR); Gabriel Bouvigne, Paris (FR); Damien Alliez, Chançay (FR); Alexis Gallet De Saint-Aurin, Versailles (FR); Mathieu Gorbinet, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/389,348

(22) Filed: Dec. 22, 2016

(65) Prior Publication Data

US 2018/0184146 A1      Jun. 28, 2018

(51) Int. Cl.
| H04N 21/2662 | (2011.01) |
| H04L 29/06 | (2006.01) |
| H04N 21/238 | (2011.01) |
| H04N 21/61 | (2011.01) |
| H04N 21/647 | (2011.01) |

(Continued)

(52) U.S. Cl.
CPC ....... H04N 21/2662 (2013.01); H04L 65/602 (2013.01); H04N 21/23805 (2013.01); H04N 21/2402 (2013.01); H04N 21/2407 (2013.01); H04N 21/6125 (2013.01); H04N 21/6175 (2013.01); H04N 21/6405 (2013.01); H04N 21/64738 (2013.01)

(58) Field of Classification Search
CPC .......... H04N 21/2662; H04N 21/23805; H04L 65/602
See application file for complete search history.

(56) References Cited

U.S. PATENT DOCUMENTS

| 6,873,877 B1* | 3/2005 | Tobias | H04L 29/06 375/E7.016 |
| 8,769,141 B2* | 7/2014 | Melnyk | H04L 47/10 370/228 |
| 9,277,289 B2 | 3/2016 | Medford et al. | |

(Continued)

FOREIGN PATENT DOCUMENTS

| EP | 1842337 B1 | 10/2016 |
| WO | 2006077500 A1 | 7/2006 |

OTHER PUBLICATIONS

Pantos, R., et al., "HTTP Live Streaming draft-pantos-http-live-streaming-19", Apr. 4, 2016, 54 pages <http://potaroo.net/cgi-bin/id2pdf?f1=draft%2dpantos%2dhttp%2dlive%2dstreaming%2d19%2etxt>.

(Continued)

*Primary Examiner* — Sumaiya A Chowdhury
(74) *Attorney, Agent, or Firm* — Patterson + Sheridan, LLP

(57) ABSTRACT

Techniques are provided for optimizing an assignment of a set of available video encoders to a plurality of video channels. Embodiments determine an optimal assignment of the set of available video encoders to the plurality of video channels, comprising, for each of the plurality of video channels, by determining a respective number of video encoders to assign to the video channel, and determining a respective set of video streams to provide for the video channel, using the assigned video encoders. The video streams are generated for the plurality of video channels, using the assigned video encoders.

18 Claims, 7 Drawing Sheets

(51) Int. Cl.
*H04N 21/24* (2011.01)
*H04N 21/6405* (2011.01)

(56) References Cited

U.S. PATENT DOCUMENTS

| | | |
|---|---|---|
| 2002/0023165 A1 | 2/2002 | Lahr |
| 2005/0149988 A1 | 7/2005 | Grannan |
| 2010/0226444 A1 | 9/2010 | Thevathasan et al. |
| 2012/0195356 A1* | 8/2012 | Yi .................. H04N 19/119 375/224 |
| 2013/0064286 A1* | 3/2013 | Karlsson .......... H04N 21/23439 375/240.02 |
| 2013/0124716 A1* | 5/2013 | Moreman .......... H04N 21/2225 709/224 |
| 2015/0030071 A1* | 1/2015 | Heng ............... H04N 21/23439 375/240.16 |
| 2016/0044080 A1* | 2/2016 | DuBreuil ............ H04L 65/4076 709/219 |

OTHER PUBLICATIONS

Saraswathi, A.T. et al., "Dynamic Resource Allocation Scheme in Cloud Computing", Procedia Computer Science, vol. 47 (2015), pp. 30-36, available online at www.sciencedirect.com. <http://ac.els-cdn.com/S1877050915004482/1-s2.0-S1877050915004482-main.pdf?_tid=99ee0538-c85c-11e6-88e2-00000aacb35f&acdnat=1482421252_606fe7055428922a64b1966404b1c76e>.

Chandra, A. et al., "Dynamic Resource Allocation for Shared Data Centers Using Online Measurements", Department of Computer Science University of Massachusetts Amherst (2003), 18 pages. <http://lass.cs.umass.edu/papers/pdf/iwqos2003_2.pdf>.

* cited by examiner

VIDEO STREAMING RESOURCE OPTIMIZATION

TECHNICAL FIELD

Embodiments presented in this disclosure generally relate to streaming content, and more specifically, embodiments disclosed herein relate to techniques for optimizing video encoder allocation across video channels.

BACKGROUND

As video transmission systems have matured, digital video is more readily available via a variety of different communications systems and networks. Specifically, digital video, such as television programs, can be transmitted as multicast digital bit streams of video signals to users over networks. Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate.

In order to reduce costs and simplify the amount of effort associated with video transmission, different video compression/de-compression techniques have been developed and established. Some of the better known and more widely adopted video compression/de-compression standards include Motion Picture Experts Group 2 (MPEG-2) data streams and Motion Picture Experts Group 4 (MPEG-4) data streams. Hence, television programs are often transmitted over the network as Motion Picture Experts Group 2 (MPEG-2) data streams or Motion Picture Experts Group 4 (MPEG-4) data streams. Conventionally, for purposes of video compression/decompression, a video stream is processed one frame at a time.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box. Such a router (e.g., the user's Internet gateway) can potentially receive multiple multicast video streams at one time (e.g., one or more streams for each of a plurality of video channels), and client devices (e.g., dedicated streaming devices such as the set-top box, mobile devices, tablet devices, etc.) can request specific streams to be output for display.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
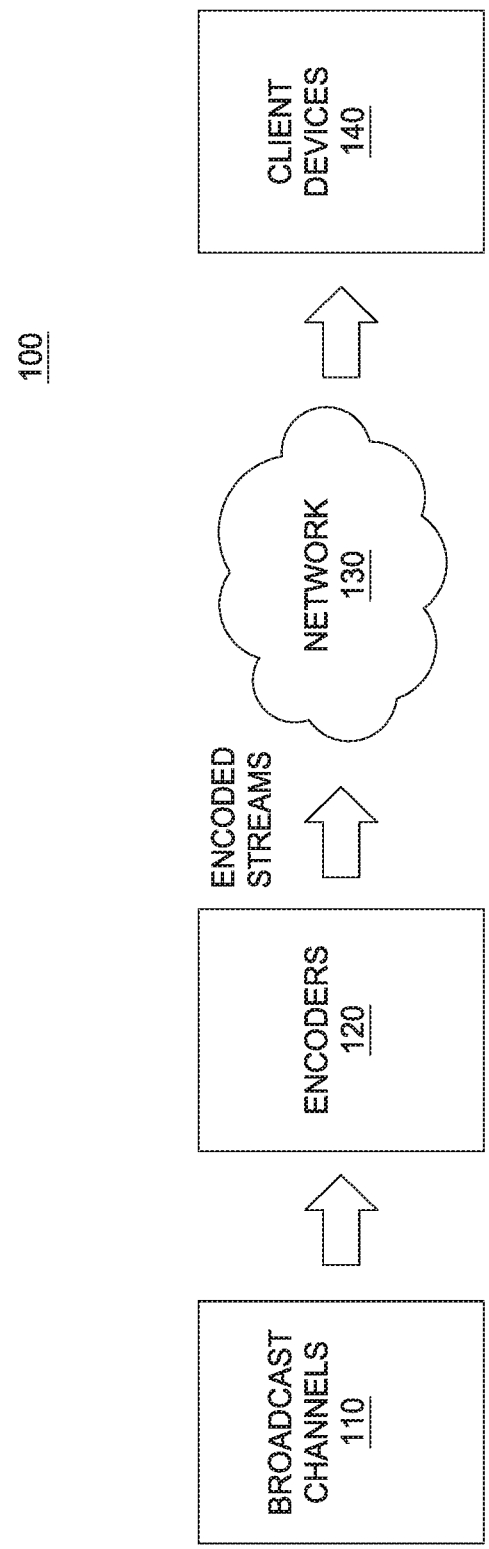
FIG. 1 illustrates a system for delivering encoded video streams to client devices, according to one embodiment described herein.

One embodiment presented in this disclosure provides a method that includes determining a plurality of video channels to deliver to a plurality of client devices. The method also includes identifying a set of available video encoders for use in encoding Adaptive Bitrate (ABR) streams for the plurality of video channels. Additionally, the method includes determining client consumption information for the plurality of video channels. The method further includes calculating an optimal assignment of the set of available video encoders to the plurality of video channels, comprising, for each of the plurality of video channels, by determining a respective number of video encoders to assign to the video channel, based on the client consumption information, and determining a respective set of ABR streams to provide for the video channel, using the assigned video encoders. The method includes generating the ABR streams for the plurality of video channels, using the assigned video encoders.

Another embodiment presented in this disclosure provides a system that includes one or more computer processors and a memory containing computer program code that, when executed by operation of the one or more computer processors, performs an operation. The operation includes determining a plurality of video channels to deliver to a plurality of client devices. The operation also includes identifying a set of available video encoders for use in encoding ABR streams for the plurality of video channels. Additionally, the operation includes determining client consumption information for the plurality of video channels. The operation further includes calculating an optimal assignment of the set of available video encoders to the plurality of video channels, comprising, for each of the plurality of video channels, by determining a respective number of video encoders to assign to the video channel, based on the client consumption information, and determining a respective set of ABR streams to provide for the video channel, using the assigned video encoders. The operation includes generating the ABR streams for the plurality of video channels, using the assigned video encoders.

Yet another embodiment presented in this disclosure provides a non-transitory computer-readable medium containing computer program code that, when executed by operation of one or more computer processors, performs an operation. The operation includes identifying a plurality of video channels to deliver to a plurality of client devices. The operation also includes determining a set of available video encoders for use in encoding ABR streams for the plurality of video channels. Additionally, the operation includes determining client consumption information for the plurality of video channels. The operation further includes calculating an optimal assignment of the set of available video encoders to the plurality of video channels, comprising, for each of the plurality of video channels, by determining a respective number of video encoders to assign to the video channel, based on the client consumption information, and determining a respective set of ABR streams to provide for the video channel, using the assigned video encoders. The operation includes generating the ABR streams for the plurality of video channels, using the assigned video encoders.

Example Embodiments

In many instances, content providers can provide multiple Adaptive Bitrate (ABR) streams for a single video channel. Such ABR streams can be used, for example, to select an optimal stream for a given client device. That is, it is generally preferable for a client device to display the highest quality video stream possible, and since network resources and processing capabilities can vary greatly between client devices, the optimal video stream can vary greatly between client devices. As an example, a very high bitrate encoding may be optimal for a dedicated streaming device on a high-speed network, while a relatively lower bitrate encoding may be optimal for a mobile device on a mobile network. As such, by providing multiple encodings at varying bitrates for each video channel, content providers can better ensure that client devices can retrieve a stream that is close to optimal for the particular client device.

Generally, while it would be ideal to provide a high number of ABR streams for each video channel offered, most providers typically operate with a fixed set of resources for producing encoded video content. That is, a given provider of video streaming content may have a fixed number of video encoders available for producing encoded video streams. As such, the content provider may have to determine how to allocate these video encoders across the plurality of video channels, in order to best satisfy the demand for video content. Additionally, the content provider may have to determine which bitrate streams should be provided for each of the video channels.

As such, embodiments provide techniques for determining an optimal allocation of available video encoders to video channels. In one embodiment, logic determines a plurality of video channels to deliver to a plurality of client devices, and determines a set of available video encoders for use in encoding ABR streams for the plurality of video channels. The logic can determine client consumption information for the plurality of video channels. For example, such client consumption information could specify a number of client devices (e.g., Internet gateway devices for users, which may in turn be delivering the streaming content to additional client devices within the user's local network) currently consuming each ABR stream for each of the plurality of video channels, device type information for the plurality of client devices, a measure of processing capabilities of the plurality of client devices, a measure of network bandwidth for the plurality of client devices, a rate at which the plurality of client devices are switching between various ABR streams for a particular video channel, and so on.

The logic could then determine an optimal assignment of the set of available video encoders to the plurality of video channels. For example, the logic could, for each of the plurality of video channels, determine a respective number of video encoders to assign to the video channel, based on the client consumption information, and could further determine a respective set of ABR streams to provide for the video channel, using the assigned video encoders. The logic could then encode the ABR streams for the plurality of video channels, using the assigned video encoders.

FIG. 1 illustrates a system for delivering encoded video streams to client devices, according to one embodiment described herein. As shown, the system 100 includes a plurality of video channels 110, a plurality of encoders 120, a network 130 and a plurality of client devices 140. Generally, a master video stream is provided for each of the video channels 110. Such a master video stream is typically a high resolution video stream containing video content for the corresponding video channel. The encoders 120 can then process the master video streams for the video channels 110 in order to produce encoded ABR video streams. For example, three of the encoders 120 could be assigned to a particular one of the video channels 110, and each of the three encoders could be configured to transcode the master video stream for the video channel at a different bitrate. As an example, the three encoders could be configured to encode the master video stream for the video channel at a relatively high bitrate, a relatively moderate bitrate and a relatively low bitrate.

The encoded streams could then be transmitted to the client devices 140 using the network 130. In doing so, the content provider could generate a manifest file specifying that the particular video channel is available in the three different bitrates, and could transmit such a manifest file to the client devices 140 using the network 130. Each of the client devices 140 could be configured to process the manifest file and to determine which of the available bitrates is optimal for the particular client device. For example, a mobile client device could be configured to select the relatively low bitrate encoding, while a dedicated video streaming device on a high-speed network connection could be configured to select the relatively high bitrate encoding. Depending on the performance of the streaming of the selected encoding, the client devices could then dynamically adjust their selected encoding. Continuing the above example, if the mobile client device determines that data packets for the video stream are arriving well in advance of their playback time, the mobile client device could request to begin receiving data packets from the moderate bitrate encoding stream. As another example, if the dedicated streaming client device determines that packets are not arriving as quickly as expected and that buffer underrun is likely to occur, the dedicated streaming client device could request to begin receiving data packets from the moderate bitrate encoding stream.

As a general matter, it can be difficult for the content provider to determine how to allocate the encoders 120 to the various video channels 110, in order to optimally satisfy the demands of the client devices 140. Generally, such an allocation involves not only determining how many of encoders 120 to allocate to each video channel 110, but also determining the bitrates for the ABR streams for each video channel 110.

One challenge in determining such an allocation is that the make-up of the client devices 140 is constantly changing over time. For example, at a given moment in time (e.g., during the late morning), a majority of the client devices 140 may be mobile devices and tablet devices that generally are consuming lower bitrate encodings, while at another moment in time (e.g., during the evening), the majority of the client devices 140 may be dedicated video streaming devices (e.g., set-top boxes) that are generally consuming higher bitrate encodings. As such, an optimal allocation of encoders 120 to video channels 110 may vary depending on the population of client devices 140 currently streaming content.

As another example, the demand for various video channels 110 can change over time. For example, a particular video channel may be the most popular video channel when a certain show or sporting event is on, but may be relatively unpopular after the certain show or sporting event has aired. The popularity of the various video channels 110 can also change as the demographic of the users of the client devices changes. For example, the population demographic watching the video channels in the late morning hours may be very different from the population demographic in the late afternoon when schools have let out, and the demand for various video channels 110 may shift as the population demographic of the users of the client devices 140 shifts.

Figure 2:
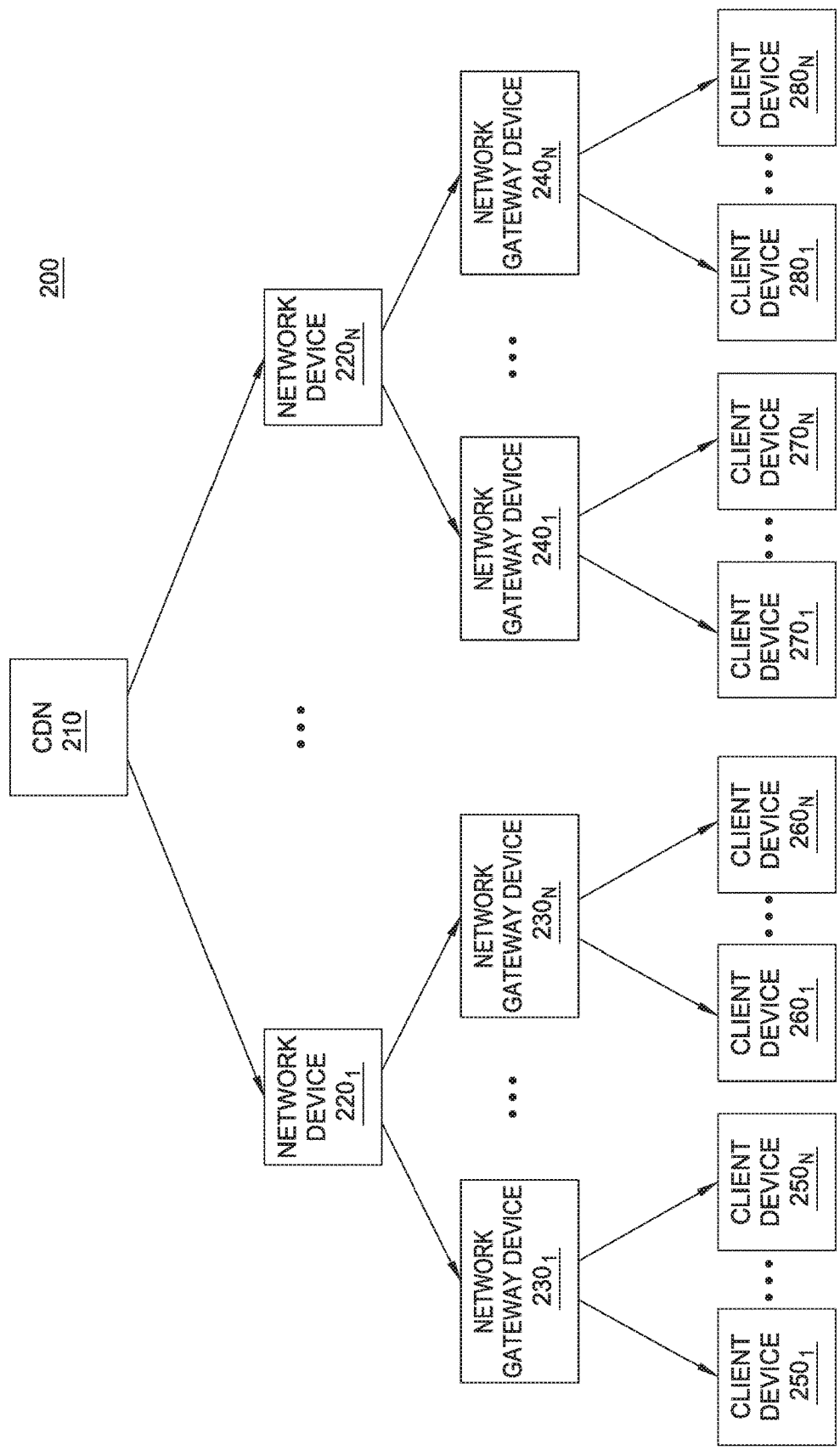
FIG. 2 illustrates a network topology for delivering encoded video streams to client devices, according to one embodiment described herein.

Generally, the encoded video streams generated by the encoders 120 can be transmitted to the client devices 140 using the network 130 in a number of different ways. One such way is through multicast communications, where particular encoded video streams are transmitted to all subscribing network devices within the network. FIG. 2 illustrates a network topology for delivering encoded video streams to client devices, according to one embodiment described herein. As shown, the network topology 200 includes a CDN 210, network devices $220_{1-N}$, client set-top boxes $230_{1-N}$ and $240_{1-N}$, and client devices $250_{1-N}$, $260_{1-N}$, $270_{1-N}$, and $280_{1-N}$. In the depicted example, the client set-top boxes $230_{1-N}$ and $240_{1-N}$ are configured to also serve as a router for a home network. Thus, for example, the client set-top box $240_1$ is configured to act as a router for the client device $270_{1-N}$.

In the depicted example, if the client device $270_1$ requests a particular encoded video stream for a particular video channel, the client set-top box $240_1$ can be configured to subscribe to multicast transmissions from the network device $220_N$ for the particular encoded video stream. In turn, the network device 220N can subscribe to multicast transmissions from the CDN 210 for the particular encoded video stream. One advantage to such an embodiment is that the data packets for the particular encoded video stream can more easily be delivered to additional devices within the network topology 200. For example, if the client device $270_N$ also requests the particular encoded video stream for the particular video channel, the client set-top box $240_1$ can simply provide the client device $270_N$ with the data packets for the particular encoded video stream already being received due to the client device $270_1$'s request. In other words, the particular encoded video stream can be provided to the client device $270_N$ without creating an additional network connection with the CDN 210, thereby reducing the workload on the CDN 210, the network device $220_N$ and the client set-top box $240_1$.

In some instances, the client set-top boxes $230_{1-N}$ and $240_{1-N}$ are configured to subscribe to multicast transmissions for at least one video stream for each of the video channels 110. In turn, the network devices $220_{1-N}$ can subscribe to multicast transmissions for the at least one video stream for each of the video channels 110. While such an embodiment creates a constant flow of network traffic between the CDN 210 and the network devices $220_{1-N}$, and between the network devices $220_{1-N}$ and the client set-top boxes $230_{1-N}$ and $240_{1-N}$, it enables any of the client devices $250_{1-N}$, $260_{1-N}$, $270_{1-N}$, and $280_{1-N}$ to retrieve data packets for the requested video streams from the corresponding client set-top box, using a local (and much faster) network connection. Moreover, regardless of the number of client devices $250_{1-N}$, $260_{1-N}$, $270_{1-N}$, and $280_{1-N}$, the workload on the CDN 210 remains constant, unlike conventional solutions where each of the client devices is configured to establish a separate network connection with the CDN 210 for streaming video content. As such, by transmitting the video streams through multicast transmission techniques, embodiments provide a more scalable video streaming solution relative to conventional techniques.

Figure 3:
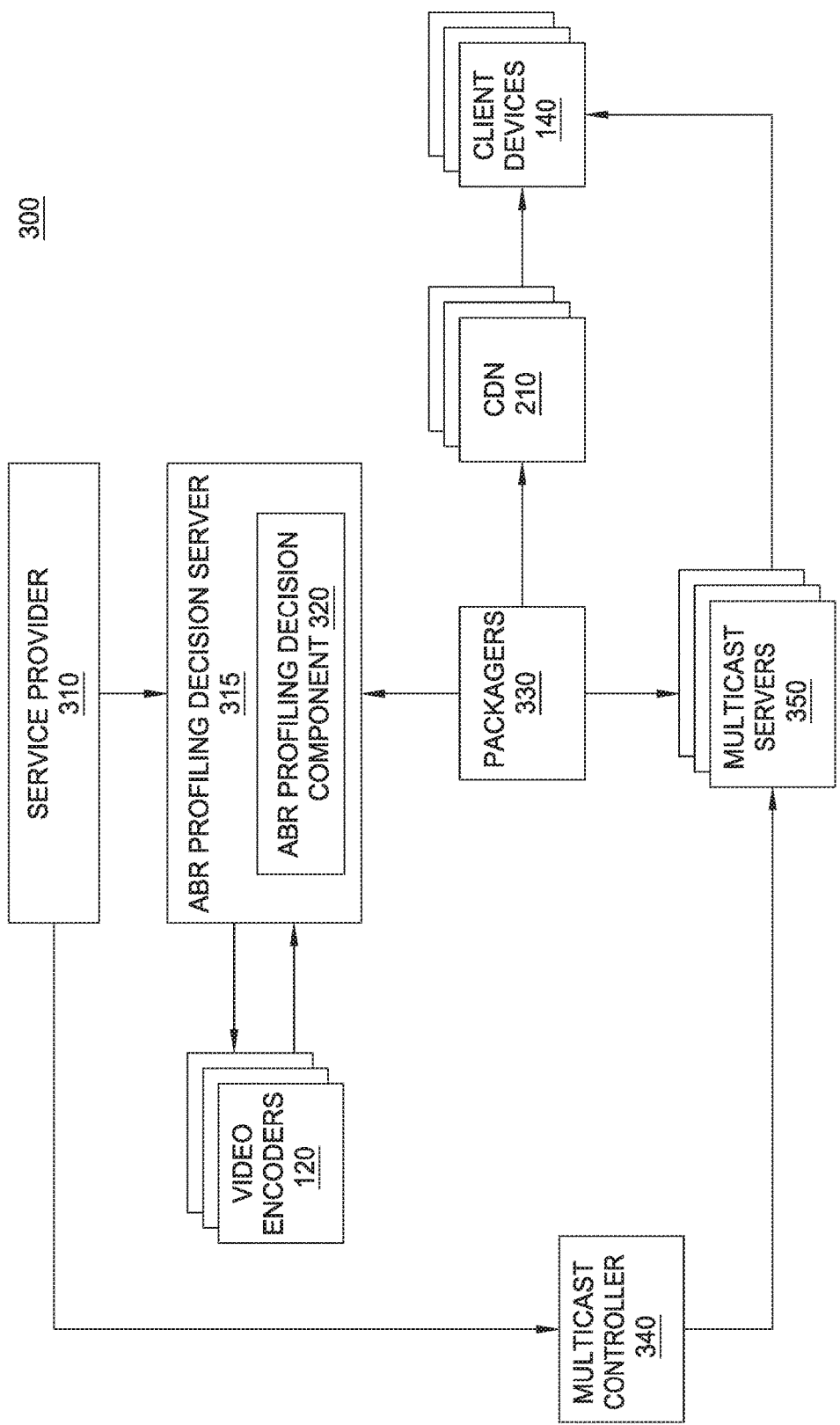
FIG. 3 illustrates a system configured with an Adaptive Bitrate (ABR) profiling decision component, according to one embodiment described herein.

One embodiment described herein provides techniques for optimally allocating encoders to video channels. FIG. 3 illustrates a system configured with an ABR profiling decision component, according to one embodiment described herein. As shown, the system 300 includes a service provide 310, an ABR profiling decision server 315 configured with an ABR profiling decision component 320, a plurality of video encoders 120, packagers 330, CDNs 210, client devices 140, a multicast controller 340 and multicast servers 350.

Generally, the ABR profiling decision component 320 is configured to determine an optimal allocation of the video encoders 120 to various video channels, in order to optimally deliver ABR streams to the client devices 140. In doing so, the ABR profiling decision component 320 can consider content consumption information, e.g., received from the client devices 140, received from the CDN 210 or multicast servers 350, and so on. For example, the ABR profiling decision component 320 could determine a plurality of video channels to deliver to content for to the client devices 140 and could determine the available video encoders 120 for use in encoding Adaptive Bitrate (ABR) streams for the plurality of video channels.

The ABR profiling decision component 320 could then determine client consumption information for the plurality of video channels. Such consumption information could include, without limitation, a current measure of client demand for each of the plurality of video channels, a current measure of demand for each available bitrate encoding for each of the plurality of video channels, types of the client devices 140, measures of processing and/or network capabilities of the client devices 140, and so on.

The ABR profiling decision component 320 could then determine an optimal assignment of the set of available video encoders to the plurality of video channels, by, for each of the plurality of video channels, determining a respective number of video encoders to assign to the video channel, based on the client consumption information, and determining a respective set of ABR streams to provide for the video channel, using the assigned video encoders In one embodiment, in determining the optimal allocation of the video encoders 120 to video channels, the ABR profiling decision component 320 is configured to scale the number of encoders 120 assigned to a given video channel with the client demand for the video channel. For example, a relatively popular video channel may receive additional video encoders 120, to help assure that an optimal bitrate encoding is available for each of the client devices watching the popular video channel. Doing so helps to ensure a positive streaming experience for the greatest number of users of the client devices 140. In doing so, however, the ABR profiling decision component 320 can be configured to assign no fewer than a minimum threshold of encoders per video channel. In some situations, where a particular video channel is extremely unpopular, the ABR profiling decision component 320 could assign only 1 or 2 encoders to the channel, as very few users will be affected if the channel is not available in an optimal bandwidth for certain client devices.

Additionally, the ABR profiling decision component 320 can be configured with a maximum threshold of encoders per video channel. That is, even if one video channel is being far the most popular channel at a given point in time (e.g., during a major sporting event), there can be diminishing returns for allocating additional encoders to the video channel in terms of user satisfaction. Thus, the ABR profiling decision component 320 can be configured so that no more than a maximum threshold of encoders is allocated to any one video channel, thereby preserving more of the video encoders 120 for encoding ABR streams for other video channels.

For example, the ABR profiling decision component 320 could determine that the client consumption information indicates that a particular video channel is currently unpopular, and thus could determine to only deliver two ABR streams for the particular video channel. The ABR profiling decision component 320 could then determine optimal bitrates to use for the two ABR streams. In doing so, the ABR profiling decision component 320 could consider the make-up of the client devices currently watching the particular video channel. For example, if the ABR profiling decision component 320 determines that the vast majority of client devices watching the particular video channel are mobile and tablet devices with relatively limited processing and bandwidth capabilities, the ABR profiling decision component 320 could determine that the two ABR streams should be encoded at a relatively low bitrate and a relatively moderate bitrate, respectively. As another example, if the ABR profiling decision component 320 determines that a substantial number of client devices with significant processing and bandwidth resources are watching the particular video channel, the ABR profiling decision component 320 could ensure that one of the two ABR streams is encoded at a relatively high bitrate. Of note, such examples are provided without limitation and for illustrative purposes only, and more generally any number of factors can be considered in allocating encoders to video channels.

The video encoders 120 can then encode the master streams for their assigned video channel to produce the ABR streams at their respective assigned bitrate. The encoded streams can then be processed by the packagers 330, which can provide the encoded ABR content to the CDN 210 and the multicast servers 350 for delivery to the client devices 140. Additionally, the packagers 330 can provide client consumption information back to the ABR profiling decision component 320, for use in refining the allocation of the video encoders 120 to the video channels. In the depicted embodiment, the CDNs 210 can be configured to deliver the encoded ABR streams to particular client devices 140 using unicast transmissions, while the multicast servers 350 can be configured to deliver the encoded ABR streams to other client devices 140 using multicast transmissions.

The client devices 140 can be configured to report back client consumption information to the ABR profiling decision component 320. Such consumption information can include, for example, which video channels are selected, which ABR streams are selected, and so on. The ABR profiling decision component 320 could then use such information to refine the allocation of video encoders 120 to the video channels.

Additionally, in allocating the video encoders 120 to the video channels, the ABR profiling decision component 320 can consider programming information describing content that is playing (or will be playing) on each of the video channels. The ABR profiling decision component 320 can also consider historical client consumption information, e.g., describing historical demand for various programs and for various ABR streams for the various programs. The ABR profiling decision component 320 could then use such information to predict a future measure of demand for each of the video channels and can use such information in determining the optimal allocation of the video encoders 120 to the video channels.

In one embodiment, the ABR profiling decision component 320 is configured to assign a weight to each factor used in determining the optimal allocation of the video encoders 120 to the video channels. Such weights could be predetermined (e.g., by a network engineer) or could be dynamically learned over time. For example, the ABR profiling decision component 320 could determine that the types of the client devices 140 is more important than the type of programming currently being shown on the selected video channel, in determining an optimal bitrate for encoding an ABR stream for the video channel. In such an example, the ABR profiling decision component 320 could assign a higher weight to the types of the client devices 140, relative to the type of programming being shown. Doing so enables the ABR profiling decision component 320 to more accurately determine the optimal allocation of encoders 120 to the video channels, and to more accurately select which bitrates to encode the ABR streams at for the video channels.

In one embodiment, the ABR profiling decision component 320 is configured to analyze the client consumption information in order to determine a pattern of behavior across a portion of the client devices 140 currently viewing a particular video channel. Such a pattern of behavior could describe, for example, the extent to which the portion of client devices are switching playback between various ABR streams for the video channel. For example, the ABR profiling decision component 320 could analyze the client consumption information and could determine that a substantial number of the client devices 140 viewing a particular video channel are repeatedly swapping between two ABR streams for the particular video channel. Based on this information, the ABR profiling decision component 320 could determine that the higher bitrate encoding of the two ABR streams should be encoded at a lower bitrate, as the substantial number of the client devices 140 cannot sustain the streaming of the higher bitrate encoding at its current level. As another example, the ABR profiling decision component 320 could determine that the video channel should no longer be encoded at the higher bitrate encoding of the two ABR streams due to the determined pattern of behavior, and could assign the video encoder 120 encoding the higher bitrate ABR stream to another ABR stream (either for the same video channel or for a different one of the video channels).

Generally, once the ABR profiling decision component 320 has determined the optimal allocation of the video encoders 120 to the video channels, the ABR profiling decision component 320 can continue to collect the client consumption information (e.g., from the packagers, from the client devices 140, etc.) and to refine the allocation of the video encoders 120 across the video channels. The ABR profiling decision component 320 can continue to monitor the programming schedule describing current and upcoming programs on each of the video channels, as well as historical client consumption information for the video channels and for the programs, in order to further refine the allocation of the video encoders 120. Doing so provides a dynamic and effective system for allocating video encoders 120 to produce ABR streams for video channels.

In some instances, the ABR profiling decision component 320 may determine that the total number of encoders has changed. For example, additional encoders may be brought online leading up to peak viewing time for the streaming content, or select encoders may be taken offline at non-peak times. As such, the ABR profiling decision component 320 can be configured to dynamically update the allocation of available encoders to the ABR streams for the video channels, as the set of available encoders changes.

Figure 4:
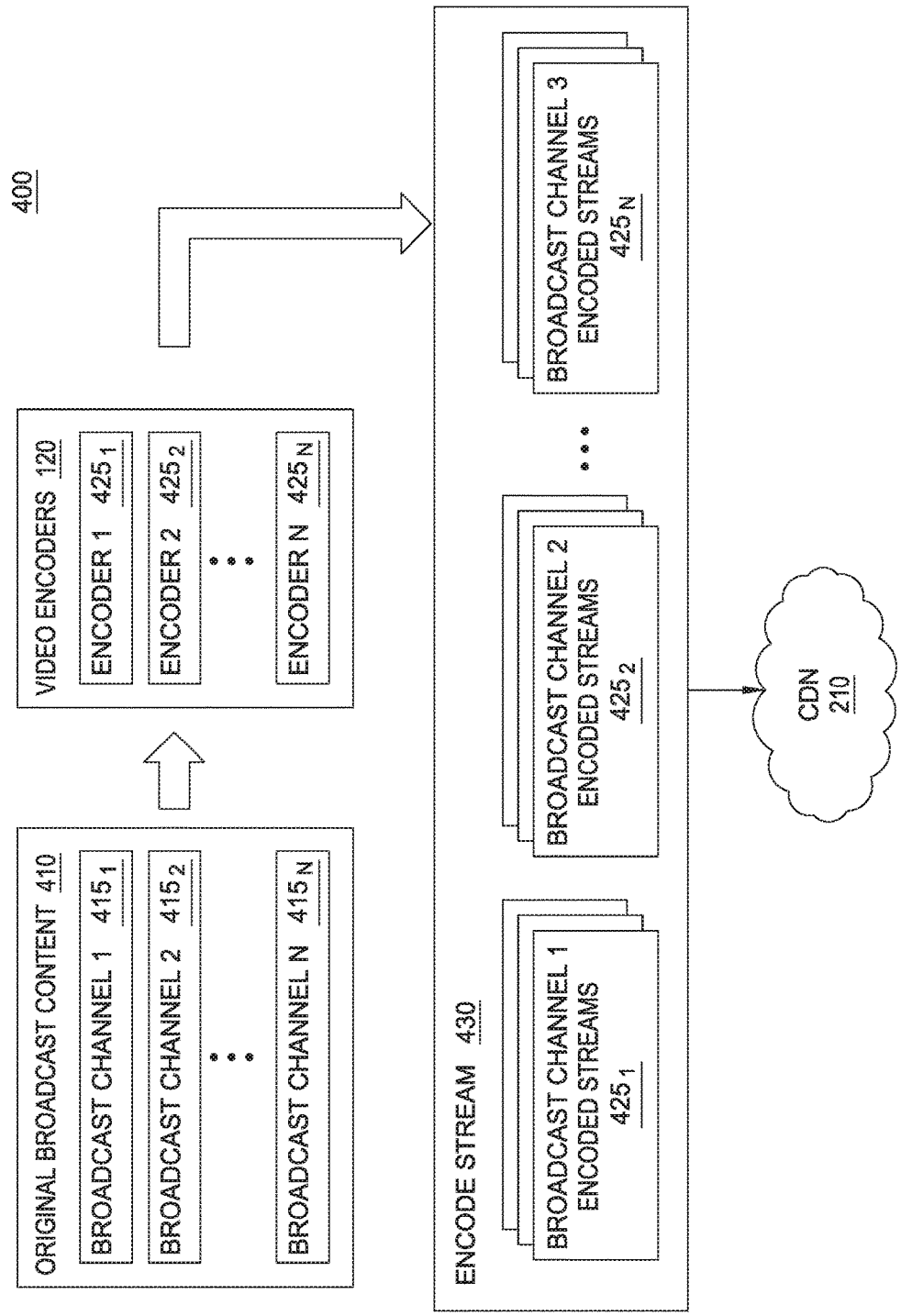
FIG. 4 illustrates a workflow for providing encoded ABR video content for a plurality of video channels, according to one embodiment described herein.

FIG. 4 illustrates a workflow for providing encoded ABR video content for a plurality of video channels, according to one embodiment described herein. As shown, the workflow 400 illustrates original broadcast content 410 (also referred to herein as master streams for video channels or broadcast television channels), video encoders 120, encoded streams 430 and CDN 210. Generally, the ABR profiling decision component 320 can determine an optimal encoding of the video encoders 120, such that no less than a minimum threshold and no more of a maximum threshold of the encoders $415_{1-N}$ is assigned to each of the video channels $415_{1-N}$. The encoded ABR video streams 430 produced by the encoders $415_{1-N}$, depicted as the video channel encoded streams $425_{1-N}$, can then be provided to CDN 210 for distribution to client devices. As discussed above, the CDN 210 can be configured to provide the encoded streams 430 to the client devices using various techniques (e.g., unicast communications, multicast communications, etc.). In a particular embodiment, the CDN 210 is configured to transmit requested streams to the client devices using unicast communications, and the encoded streams 430 can also be provided to a multicast server (not shown) for transmission to client devices using multicast communications.

In one embodiment, the ABR profiling decision component 320 can enable the content provider to define various performance metrics which impact the allocation of encoders to video channels. For example, the ABR profiling decision component 320 could enable the content provider to define an eligibility rate, which specifies the maximum percentage of client devices that cannot access the video channel in real-time (e.g., per device type). If the ABR profiling decision component 320 then determines that the percentage of devices unable to access the content in real-time exceeds the eligibility rate, the ABR profiling decision component 320 could allocate one or more additional encoders to the video channel in question, and could configure the additional encoder(s) to encode an ABR stream(s) at a bitrate(s) determined to lower the percentage of devices unable to access the streaming content.

Additionally, the ABR profiling decision component 320 could allow the content provider to define a targeted quality, which specifies a target ratio of users in different quality segments (e.g., per device type, per time of day, etc.). If the ABR profiling decision component 320 determines that a particular quality segment has too many or too few users, as defined by the targeted quality, the ABR profiling decision component 320 could add modify the allocation of encoders to the video channel in question. For example, the ABR profiling decision component 320 could add or remove an encoder(s) from the video channel, and/or the ABR profiling decision component 320 could modify the bitrate an allocated encoder is encoding at. Doing so enables the content provider to ensure that a desired ratio of client devices per quality level is achieved over time.

Figure 5:
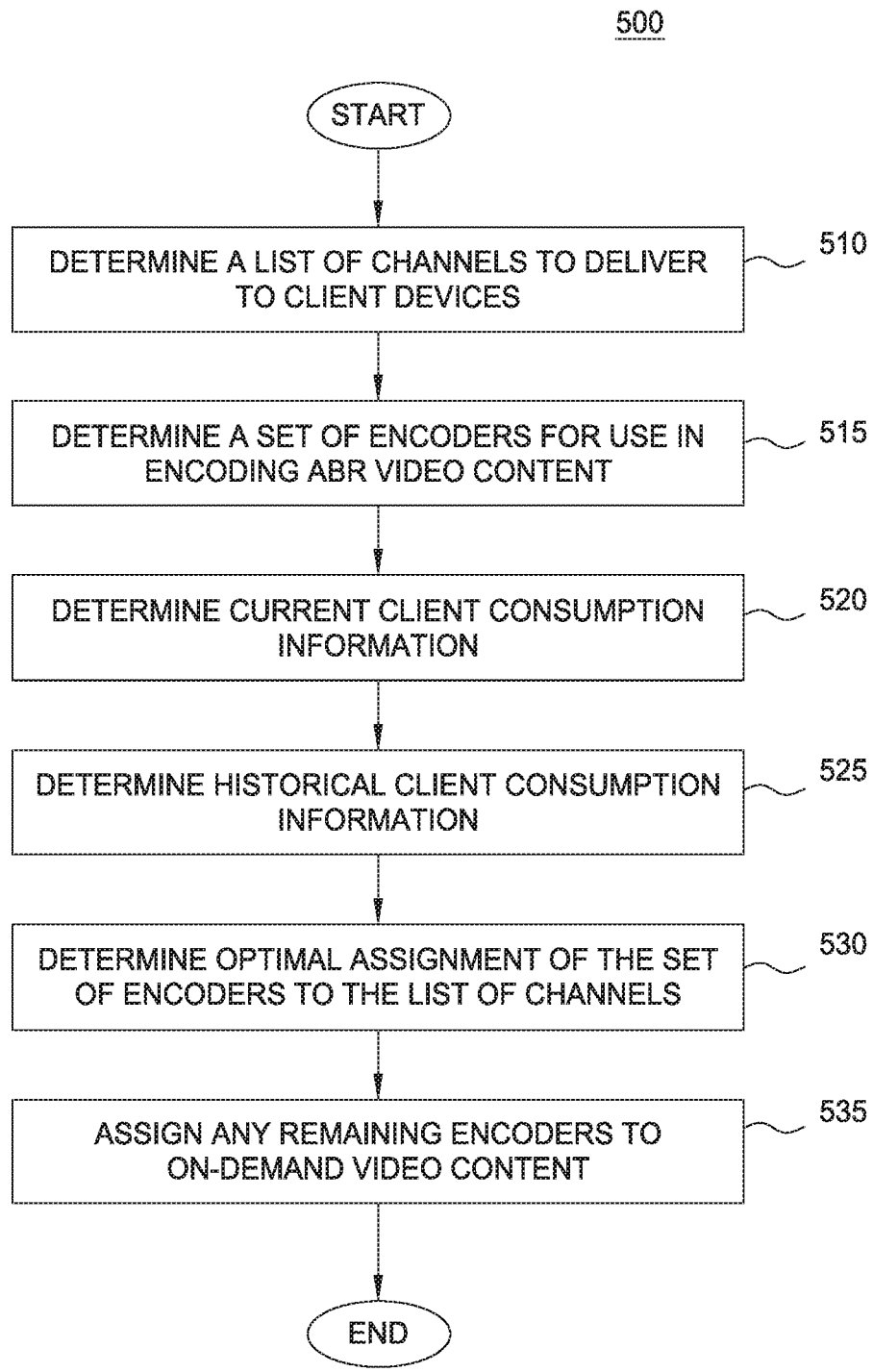
FIG. 5 is a flow diagram illustrating a method of determining an optimal assignment of video encoders to video channels, according to one embodiment described herein.

FIG. 5 is a flow diagram illustrating a method of determining an optimal assignment of video encoders to video channels, according to one embodiment described herein. As shown, the method 500 begins at block 510, where the ABR profiling decision component 320 determines a list of video channels to deliver to client devices. The ABR profiling decision component 320 also determines a set of encoders for use in encoding ABR video content for the various video channels (block 515).

The ABR profiling decision component 320 further determines current client consumption information for client devices currently consuming ABR streams of the list of video channels (block 520). Such client consumption information can indicate, for example, types of client devices currently consuming content, processing and networking resources of the client devices currently consuming content, the number of client devices consuming each channel and each ABR stream, patterns of behavior of the client devices (e.g., constantly switching between two ABR streams for a given channel) and so on.

Additionally, the ABR profiling decision component 320 determines historical client consumption information (block 525). For example, the ABR profiling decision component 320 could retrieve historical information describing the popularity of the various video channels at historical points in time (e.g., an average demand during historical weeks for the current day of the week at the current moment in time). Such historical information can also describe the historical demand for the current programming content of the video channel in question.

The ABR profiling decision component 320 then determines an optimal assignment of the set of available encoders to the list of video channels (block 530). In doing so, the ABR profiling decision component 320 can determine how many encoders should be allocated to each of the video channels, and can further determine which bitrate each encoder should be configured to transcode the corresponding master broadcast stream at.

In the depicted embodiment, the ABR profiling decision component 320 further assigns any remaining encoders to encode on-demand video content (block 535), and the method 500 ends. That is, as discussed above, applying additional encoders to a given video channel generally has diminishing returns in terms of consumer satisfaction. For example, the consumer satisfaction of all users may be impacted very little, if an additional encoder is assigned to the least popular video channel. Likewise, the consumer satisfaction of all users may be impacted very little if an additional encoder is assigned to a video channel which is already assigned a substantial number of encoders. As such, the ABR profiling decision component 320 could determine an allocation in which at least one encoder is not assigned to any of the video channels, and could assign such an encoder(s) to encoding other video content (e.g., on-demand video content). In another embodiment, where the provider of the ABR profiling decision component 320 pays per encoder in use, the ABR profiling decision component 320 could determine to release the remaining encoder(s) to avoid incurring additional fees for the provider.

Figure 6:
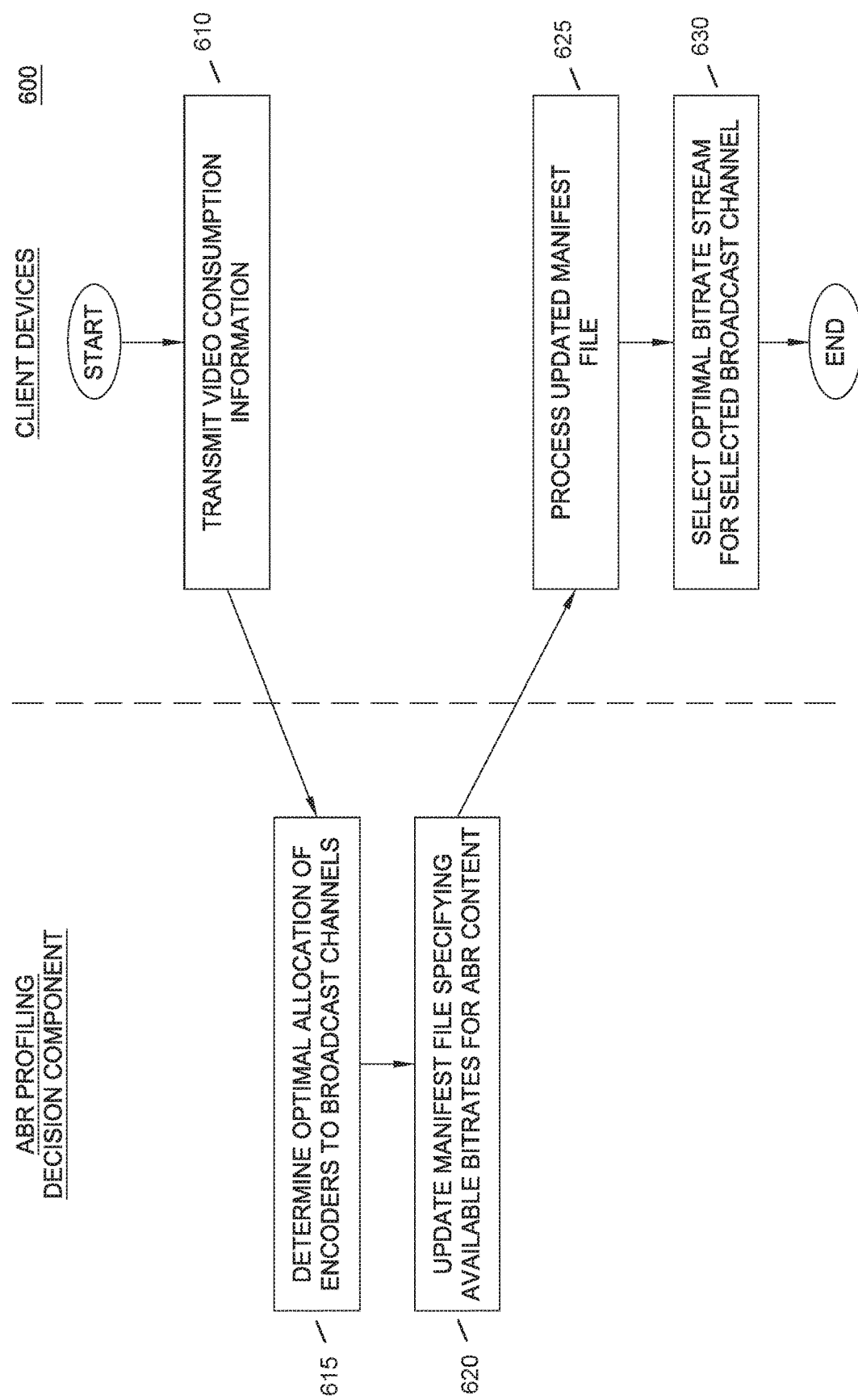
FIG. 6 is a flow diagram illustrating a method of iteratively refining an optimal assignment of video encoders to video channels based on client video consumption information, according to one embodiment described herein.

FIG. 6 is a flow diagram illustrating a method of iteratively refining an optimal assignment of video encoders to video channels based on client video consumption information, according to one embodiment described herein. As shown, the method 600 begins at block 610, where the client devices consuming the ABR streams transmit video consumption information to the ABR profiling decision component 320. In some embodiments, as discussed above, the ABR profiling decision component 320 can receive video consumption information from other sources, in addition to or in lieu of the client devices. Such other sources include, for example and without limitation, packagers 335, CDN 210, and multicast servers 350.

The ABR profiling decision component 320 then determines an optimal allocation of encoders to the various video channels (block 615), and updates a manifest file specifying available bitrates for ABR content for each of the video channels (block 620). Upon receiving the updated manifest file, the ABR profiling decision component 320 processes the updated manifest file (block 625). Generally, the manifest file informs the client devices which ABR streams are available for a given video channel, which in turn allows the client devices to intelligently select an optimal one of the ABR streams based on the current conditions of the client device (block 630), and the method 600 ends. Of note, the method 600 can then be repeated multiple times, allowing the ABR profiling decision component 320 to continuously refine the allocation of encoders to ABR streams and video channels as consumer demand changes.

Figure 7:
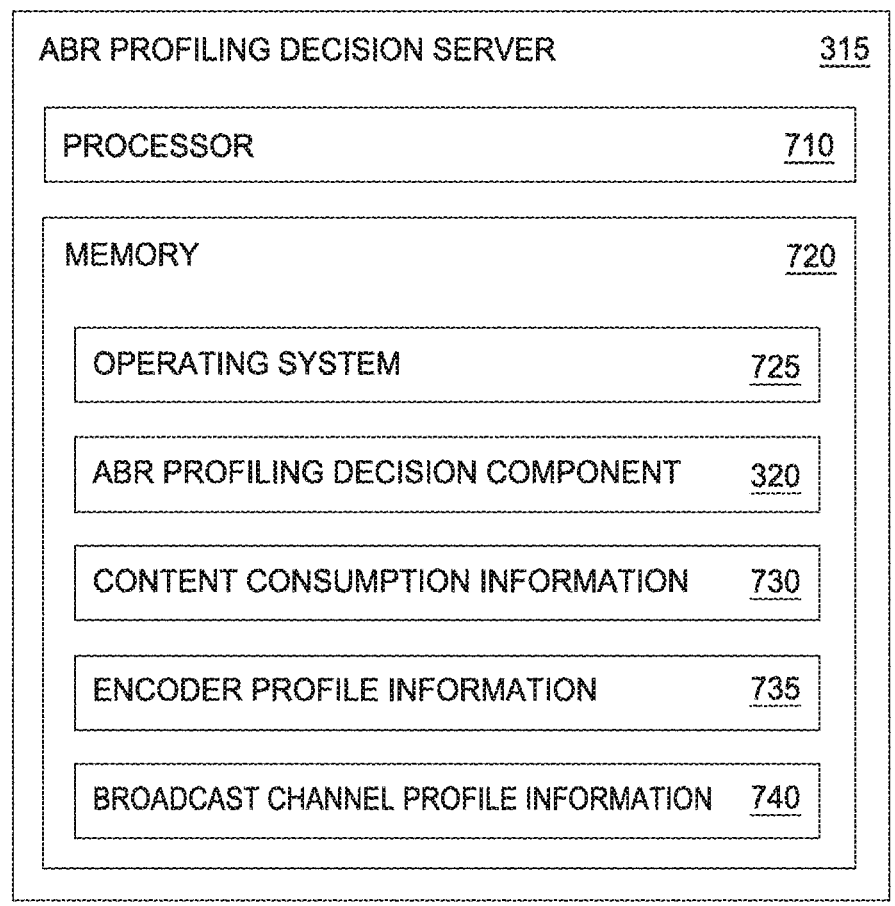
FIG. 7 is a block diagram illustrating a system configured with an ABR profiling decision component, according to one embodiment described herein.

FIG. 7 is a block diagram illustrating a system configured with an ABR profiling decision component, according to one embodiment described herein. As shown, the ABR profiling decision server 315 includes, without limitation, a central processing unit (CPU) 710, a memory 720 and may further include a network interface (not shown). The server 315 may also include an I/O device interface connecting I/O devices (e.g., keyboard, display and mouse devices) to the server 315.

The CPU 710 generally retrieves and executes programming instructions stored in the memory 720. Similarly, the CPU 710 stores and retrieves application data residing in the memory 720. The server 315 may include an interconnect, which facilitates transmission, such as of programming instructions and application data, between the CPU 710, I/O device interface, storage, network interface, and memory 720. The CPU 710 is representative of one or more of a single CPU, multiple CPUs, a single CPU having multiple processing cores, and the like. And the memory 760 is generally included to be representative of a random access memory.

The server 315 may further include or otherwise be connected to storage media. Such storage may be a flash drive or a disk drive storage device. The storage may be a combination of fixed or removable storage devices, such as fixed disc drives, flash drives, removable memory cards or optical storage, network attached storage (NAS), or a storage area-network (SAN). The network interface may include a wireless communication transceiver for transmitting and receiving tuned note frequencies to/from other tuning devices, if any. Further, the system 315 is included to be representative of a physical computing system, such as a mobile phone or tablet or a tuning apparatus, as well as virtual machine instances hosted on a set of underlying physical computing systems. Further still, although shown as a single computing system, one of ordinary skill in the art will recognized that the components of the system 315 shown in FIG. 7 may be distributed across multiple computing systems connected by a data communications network.

As shown, the memory 720 includes an operating system 725, the ABR profiling decision component 320, content consumption information 730, encoder profile information 735 and video channel profile information 740. Generally, the ABR profiling decision component 320 can analyze the video channel profile information 740 to determine a plurality of video channels to deliver to a plurality of client devices, and can analyze the encoder profile information 735 to determine a set of available video encoders for use in encoding Adaptive Bitrate (ABR) streams for the plurality of video channels. The ABR profiling decision component 320 can then analyze the content consumption information 730 to determine attributes of content consumption of the ABR streams for the plurality of video channels across a plurality of client devices. Such content consumption information 730 could be collected from, for example, the client devices, a packager of video content, a multicast server, a CDN, etc. The ABR profiling decision component 320 could then determine an optimal assignment of the set of available video encoders to the plurality of video channels, comprising, for each of the plurality of video channels, by determining a respective number of video encoders to assign to the video channel, based on the client consumption information, and determining a respective set of ABR streams to provide for the video channel, using the assigned video encoders. The encoders could then produce the ABR streams for the plurality of video channels, for delivery to the client devices (e.g., via the CDN, via the multicast servers, etc.).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., a video streaming service) or related data available in the cloud. For example, the ABR profiling decision component 320 could execute on a computing system in the cloud and could determine an optimal allocation of video encoders to video channels based on client consumption information. Doing so helps to ensure that client devices can access an optimal ABR stream for a selected video channel from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
identifying a plurality of video channels to deliver to a plurality of client devices;
determining a set of available video encoders for use in encoding Adaptive Bitrate (ABR) streams for the plurality of video channels in real-time;
determining real-time client consumption information for the plurality of video channels, based on measures of current consumption received from the plurality of client devices for the plurality of video channels;
calculating an optimal assignment of the set of available video encoders to the plurality of video channels, comprising, for each of the plurality of video channels:
determining a respective number of video encoders to assign to the video channel, based on the real-time client consumption information;
determining a respective set of ABR streams to provide for the video channel, using the assigned video encoders;
determining, based on the real-time client consumption information, an optimal bitrate at which to encode each of the ABR streams in the set of ABR streams for the video channel; and
generating the ABR streams for the plurality of video channels at the determined optimal bitrates, using the assigned video encoders.

2. The method of claim 1, wherein determining the real-time client consumption information for the plurality of video channels further comprises:
retrieving historical consumption information for the plurality of video channels; and
generating a predicted measure of consumption for each of the plurality of video channels, based on the measure of current consumption and the historical consumption information,
wherein determining the respective number of video encoders to assign to the video channel is based on the predicted measure of consumption for the video channel.

3. The method of claim 2, wherein generating the predicted measure of consumption for each of the plurality of video channels further comprises:
retrieving an upcoming programming schedule for each of the plurality of video channels,
wherein the predicted measure of consumption for each of the plurality of video channels is further based on the upcoming programming schedule for the respective video channel.

4. The method of claim 1, further comprising:
transmitting the encoded ABR streams to the plurality of client devices over a data communications network using multicast communication techniques.

5. The method of claim 1, wherein determining the optimal bitrate at which to encode each of the ABR streams in the set of ABR streams for the video channel is further based on client device information for a portion of the plurality of client devices currently consuming streaming video content associated with the video channel, wherein the client device information specifies at least one of factors (i) a type of a first client device of the plurality of client devices, (ii) a measure of processing capabilities of the first client device, and (iii) a measure of network resources available to the first client device.

6. The method of claim 5, wherein determining the optimal bitrate at which to encode each of the ABR streams in the set of ABR streams for the video channel further comprises:
determining a respective weighting for each of the factors (i), (ii) and (iii), where the weighting specifies how the respective factor is weighted relative to the other factors.

7. The method of claim 1, further comprising:
upon encoding the ABR streams for the plurality of video channels using the assigned video encoders, assigning any remaining video encoders in the set of available video encoders to encoding non-broadcast video content.

8. The method of claim 1, wherein the real-time client consumption information for the plurality of video channels is received from a content distribution server, and wherein the real-time client consumption information specifies a number of user network devices that are currently being served with ABR streams for the plurality of video channels over multicast communications.

9. The method of claim 8, wherein determining the respective number of video encoders to assign to the video channel, based on the client consumption information further comprises:
determining a pattern of behavior across a portion of the plurality of client devices currently viewing the video channel, wherein the pattern of behavior describes how the portion of client devices are switching playback between various ABR streams for the video channel.

10. The method of claim 1, further comprising:
subsequent to encoding the ABR streams for the plurality of video channels, using the assigned video encoders, determining updated client consumption information at a subsequent moment in time for the plurality of video channels; and
determining a second optimal assignment of the set of available video encoders to the plurality of video channels, at the subsequent moment in time, based on the updated client consumption information.

11. A system, comprising:
one or more computer processors; and
a memory containing computer program code that, when executed by operation of the one or more computer processors, performs an operation comprising:
identifying a plurality of video channels to deliver to a plurality of client devices;
determining a set of available video encoders for use in encoding Adaptive Bitrate (ABR) streams for the plurality of video channels in real-time;
determining real-time client consumption information for the plurality of video channels, based on measures of current consumption received from the plurality of client devices for the plurality of video channels;
calculating an optimal assignment of the set of available video encoders to the plurality of video channels, comprising, for each of the plurality of video channels:
determining a respective number of video encoders to assign to the video channel, based on the real-time client consumption information;

determining a respective set of ABR streams to provide for the video channel, using the assigned video encoders;

determining, based on the real-time client consumption information, an optimal bitrate at which to encode each of the ABR streams in the set of ABR streams for the video channel; and generating the ABR streams for the plurality of video channels at the determined optimal bitrates, using the assigned video encoders.

12. The system of claim 11, wherein determining the real-time client consumption information for the plurality of video channels further comprises:

retrieving historical consumption information for the plurality of video channels;

retrieving an upcoming programming schedule for each of the plurality of video channels; and generating a predicted measure of consumption for each of the plurality of video channels, based on the measure of current consumption, the historical consumption information, and the upcoming programming schedule for the respective video channel, wherein determining the respective number of video encoders to assign to the video channel is based on the predicted measure of consumption for the video channel.

13. The system of claim 12, wherein the real-time client consumption information for the plurality of video channels is received from a content distribution server, and wherein the real-time client consumption information specifies a number of user network devices that are currently being served with ABR streams for the plurality of video channels over multicast communications, and wherein determining the respective number of video encoders to assign to the video channel, based on the real-time client consumption information further comprises:

determining a pattern of behavior across a portion of the plurality of client devices currently viewing the video channel, wherein the pattern of behavior describes how the portion of client devices are switching playback between various ABR streams for the video channel.

14. The system of claim 11, the operation further comprising:

transmitting the encoded ABR streams to the plurality of client devices over a data communications network using multicast communication techniques.

15. The system of claim 11, wherein determining the respective set of ABR streams to provide for the video channel, using the assigned video encoders, further comprises determining, based on the real-time client consumption information, an optimal bitrate at which to encode each of the ABR streams in the set of ABR streams for the video channel, and wherein determining the optimal bitrate at which to encode each of the ABR streams in the set of ABR streams for the video channel is further based on client device information for a portion of the plurality of client devices currently consuming streaming video content associated with the video channel, wherein the client device information specifies at least one of factors (i) a type of a first client device of the plurality of client devices, (ii) a measure of processing capabilities of the first client device, and (iii) a measure of network resources available to the first client device.

16. The system of claim 15, wherein determining the optimal bitrate at which to encode each of the ABR streams in the set of ABR streams for the video channel further comprises:

determining a respective weighting for each of the factors (i), (ii) and (iii), where the weighting specifies how the respective factor is weighted relative to the other factors.

17. The system of claim 11, the operation further comprising:

upon encoding the ABR streams for the plurality of video channels using the assigned video encoders, assigning any remaining video encoders in the set of available video encoders to encoding non-broadcast video content.

18. A non-transitory computer-readable medium containing computer program code that, when executed by operation of one or more computer processors, performs an operation comprising:

identifying a plurality of video channels to deliver to a plurality of client devices;

determining a set of available video encoders for use in encoding Adaptive Bitrate (ABR) streams for the plurality of video channels in real-time;

determining real-time client consumption information for the plurality of video channels, based on measures of current consumption received from the plurality of client devices for the plurality of video channels;

calculating an optimal assignment of the set of available video encoders to the plurality of video channels, comprising, for each of the plurality of video channels:

determining a respective number of video encoders to assign to the video channel, based on the real-time client consumption information;

determining a respective set of ABR streams to provide for the video channel, using the assigned video encoders;

determining, based on the real-time client consumption information, an optimal bitrate at which to encode each of the ABR streams in the set of ABR streams for the video channel; and generating the ABR streams for the plurality of video channels at the determined optimal bitrates, using the assigned video encoders.

* * * * *